US008595990B1

(12) United States Patent
Greene

(10) Patent No.: US 8,595,990 B1
(45) Date of Patent: Dec. 3, 2013

(54) HAND RAIL FOR ROOF OF GRAIN BIN

(71) Applicant: Greene Welding and Hardware, Inc., East Lynn, IL (US)

(72) Inventor: Rex A. Greene, East Lynn, IL (US)

(73) Assignee: Green Welding and Hardware, Inc., East Lynn, IL (US)

( * ) Notice: Subject to any disclaimer, the term of this patent is extended or adjusted under 35 U.S.C. 154(b) by 0 days.

(21) Appl. No.: 13/786,607

(22) Filed: Mar. 6, 2013

Related U.S. Application Data

(63) Continuation-in-part of application No. 13/606,296, filed on Sep. 7, 2012, now Pat. No. 8,434,273, and a continuation-in-part of application No. 13/630,576, filed on Sep. 28, 2012.

(51) Int. Cl.
E04B 7/00 (2006.01)

(52) U.S. Cl.
USPC ............. 52/82; 52/182; 52/187; 52/192

(58) Field of Classification Search
USPC ............. 52/82, 182, 187, 192, 193, 194, 195, 52/196, 197, 223.3, 244, 245, 650.3, 52/745.01; 296/45, 82, 128
See application file for complete search history.

(56) References Cited

U.S. PATENT DOCUMENTS

| | | | |
|---|---|---|---|
| 1,732,400 A * | 10/1929 | Eaton | 52/192 |
| 1,981,422 A * | 11/1934 | Kreutzer | 454/174 |
| 2,623,643 A * | 12/1952 | Seamans | 212/179 |
| 3,583,112 A * | 6/1971 | Kennedy | 52/82 |
| 3,595,510 A * | 7/1971 | Hutchinson | 248/175 |
| 4,143,740 A | 3/1979 | Matthews | |
| 4,355,700 A | 10/1982 | Matthews et al. | |
| 4,419,851 A * | 12/1983 | Kruger | 52/184 |
| 4,527,366 A | 7/1985 | Greene et al. | |
| 4,867,046 A * | 9/1989 | Yoder | 454/174 |
| 5,586,678 A * | 12/1996 | Rosch et al. | 220/263 |
| 5,638,917 A * | 6/1997 | Vennen | 182/150 |
| 5,829,549 A * | 11/1998 | Flynn | 182/82 |
| 6,698,143 B2 * | 3/2004 | Jensen et al. | 52/82 |
| 6,886,662 B2 * | 5/2005 | Riley | 182/82 |
| 7,487,619 B2 * | 2/2009 | Glenn | 52/194 |
| 8,220,207 B2 * | 7/2012 | Shan et al. | 52/82 |
| 2003/0217520 A1 * | 11/2003 | Jensen et al. | 52/82 |
| 2006/0213722 A1 * | 9/2006 | Cunningham | 182/82 |
| 2008/0155909 A1 * | 7/2008 | Grossman et al. | 52/192 |
| 2010/0139185 A1 * | 6/2010 | Neighbors | 52/194 |

* cited by examiner

Primary Examiner — James Buckle, Jr.
(74) Attorney, Agent, or Firm — Cook Alex Ltd.

(57) ABSTRACT

A hand rail assembly for the roof of a grain bin includes plural units each having a plate having openings spaced from each other and adjacent each longitudinal edge of the plate. Some of the openings align with openings in the roof whereby the plate may be attached to the roof. A pair of ring segments extend substantially perpendicular to the plate and rest upon the plate. Openings in the ring segments align with openings in the plate whereby the ring segments may be attached to an upper face of the plate. A gusset extends upwardly from the ring segments, and the gusset and ring segments are attached together. A hand rail comprising a vertical post is attached at one end to the gusset, and a horizontal rail is attached to the post.

24 Claims, 2 Drawing Sheets

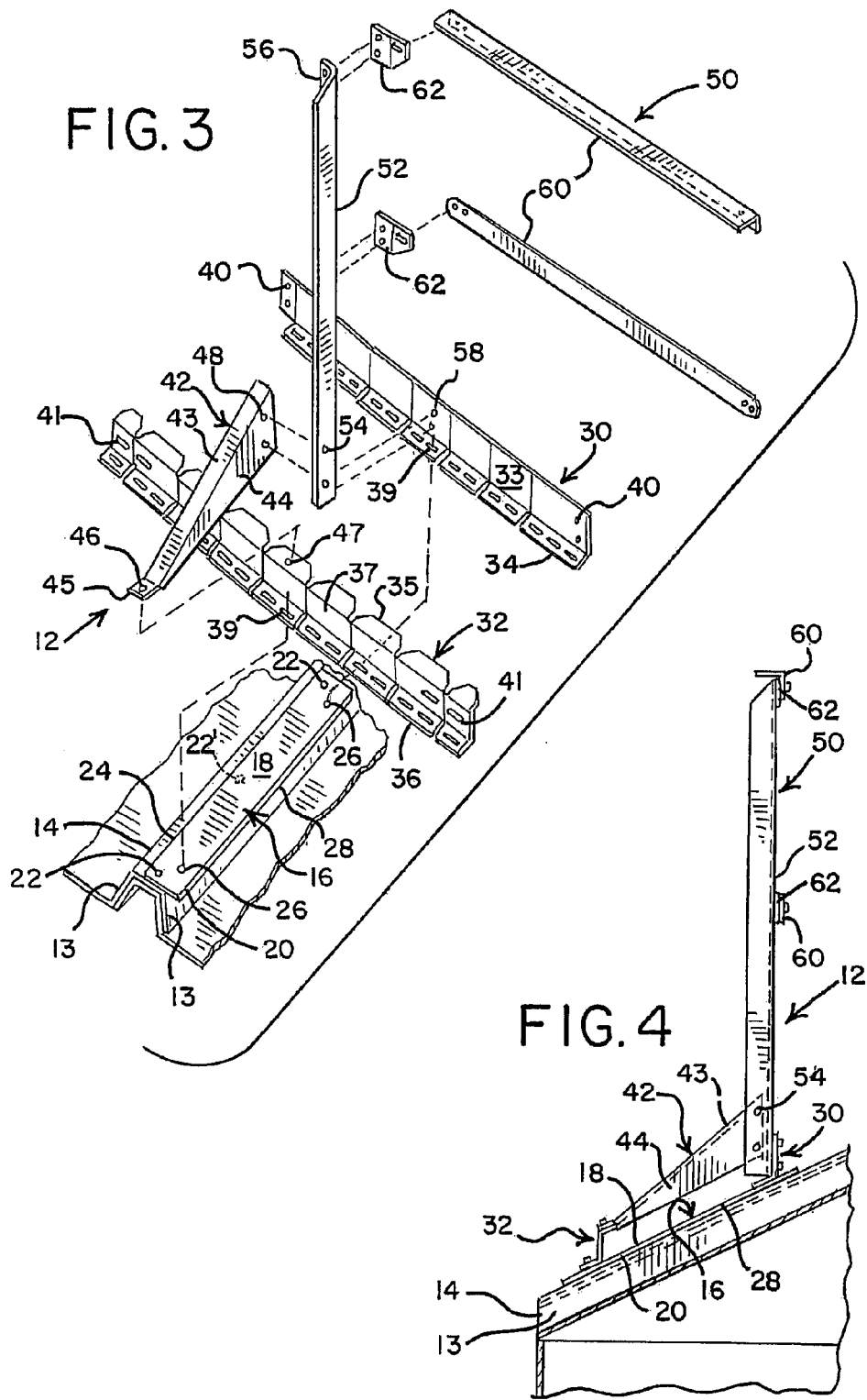

HAND RAIL FOR ROOF OF GRAIN BIN

BACKGROUND AND SUMMARY OF THE INVENTION

The present invention relates to a hand rail assembly for assembly on the inclined roof of a cylindrical storage structure.

Cylindrical storage structures having inclined roofs, such as grain bins for the storage of grain, are typically filled by conveying the grain to the peak of the roof through an access which may be opened to admit the grain and closed to protect the grain from weather once the grain is in the grain bin. To ensure proper ventilation of the grain bin, several power exhaust fans are typically located on the inclined roof toward its top, and the fans are spaced from each other around the curvature of the roof. Once the grain has been admitted to the grain bin, the only reasonable access to these power exhaust fans to service them is from the roof of the grain bin. In order to facilitate the servicing of these power exhaust fans, decks have been mounted on the roof of the grain bin in proximity to the exhaust fans to permit access to the fans from the roof by service personnel. Once such roof deck construction is disclosed in my copending U.S. patent application Ser. No. 13/606,296, filed Sep. 7, 2012, the disclosure of which is incorporated herein in its entirety by reference.

Such grain bins also have screened vents spaced around the lower end of the inclined roof through which air is drawn into the top of the grain bin by the power exhaust fans. The air which enters through the vents is circulated above the grain and exhausted by the power exhaust fans. The vents are also used to release air when aeration fans at the floor of the bin are operated under the grain to push air upward from the bottom of the bin for maintaining grain condition. These vents may be numerous and on larger diameter grain bins may be upward to seventy in number.

It is periodically desired to fumigate the grain in the bin with certain gases which are introduced at the bottom of the grain bin to kill pests and neutralize certain undesirable contaminants which may be on the grain, such as molds or the like. During such fumigation, the vents are covered with a covering such as a plastic sheet or bag to block air from entering the grain bin through the vents. Also when the aeration fans force air upward from the floor of the bin, debris can catch on the vent screens, or weather conditions can cause icing on the screens. When either of these conditions occur, the vents cannot release the necessary air volume and can result in roof damage. Covering and uncovering of the vents for the fumigation procedure and maintenance and cleaning of the vent screens has typically been accomplished in the past by service personnel who are positioned at and moved sequentially one by one between each of the vents by a cherry picker.

In my copending U.S. application Ser. No. 13/630,576, filed Sep. 28, 2012, the disclosure of which is also incorporated herein in its entirety by reference, a deck is disclosed which extends around and encircles the cylindrical side wall of the grain bin beneath the bottom of its inclined roof and adjacent to the top of the side wall and to the vents to permit service personnel to access the vents from the exterior of the grain bin to cover and uncover the grain bin vents and to clean, inspect and maintain the vents without the need for a cherry picker.

Grain bins come in a variety of sizes and configurations depending upon the manufacturer, and the location of the power exhaust fans along the incline of the roof frequently varies depending upon the grain bin manufacturer. Because of this and for other reasons, decks which have previously been offered and which were to be assembled on any particular grain bin needed to be formed of components which were custom sized and shaped to fit the particular size and configuration of that manufacturer's bin. Thus, the dimensions of the various components of the deck, such as the deck plates, hand rails and the like, were custom sized and configured for each given grain bin.

In both of my aforementioned applications, the deck assemblies disclosed overcome the need for such customization of the sizes and shapes of the components needed to assemble a deck on a given grain bin. In those deck assemblies, all of the components of the assemblies may be of standard uniform size and shape without regard to the size of the grain bin or its configuration, the spacing of the roof ribs on the grain bin or fastener openings in the ribs, or the manufacturer of the grain bin. This substantially facilitated the assembly of the decks and substantially reduced the inventory of components needed to accommodate the several different grain bins that were currently on the market.

In some instances, the owner of the grain bin may wish to reduce the weight of the aforementioned deck assemblies, their cost and/or the time and labor needed to assemble and install the deck assemblies on the grain bin.

In the present invention, portions of the aforementioned assemblies have been eliminated including the decks themselves, and a hand rail assembly has been provided which permits service personnel to access the fans and/or vents by safely walking on the inclined roof. Moreover, the hand rail assembly of the present invention accomplishes this without sacrificing the ability of using components of standard uniform size and shape as previously discussed with respect to the aforementioned deck assemblies.

In one principal aspect of the present invention, a hand rail assembly for the inclined roof of a generally cylindrical storage structure comprises an elongate plate extending substantially parallel to the incline of the roof and having an upper face and a lower face facing the roof, a first pair of openings longitudinally spaced from each other and adjacent one longitudinal edge of the plate, and a second pair of openings longitudinally spaced from each other and adjacent the other longitudinal edge of the plate. The spacing of the first pair of openings is substantially the same as the spacing of openings in the roof whereby the plate may be attached to the roof with the lower face facing the roof by fastening means extending through the first openings and the openings in the roof. A pair of ring segments spaced from each other in the direction of the incline of the roof extend substantially perpendicular to the elongate plate and are constructed and arranged to rest upon the upper face of the plate. A plurality of openings are in the ring segments and at least one of these openings is aligned with the second pair of openings in the elongate plate whereby the ring segments may be attached to the upper face of the plate by fastening means extending through at least one opening in each of the ring segments and the second openings in the plate. A gusset extends substantially parallel to the incline of the roof and upwardly from the side of the ring segments opposite the plate, and the gusset and the ring segments have fastening means for attaching them together. A hand rail comprising a substantially vertical post is attached at one end to the gusset and at least one horizontal rail is attached to the vertical post toward its other end.

In still another principal aspect of the present invention, the ring segments have a plurality of openings spaced from each other along the length of the ring segments.

In still another principal aspect of the present invention, the openings in the ring segments are slots.

In still another principal aspect of the present invention, the gusset is substantially triangular in outline.

In still another principal aspect of the present, invention, the assembly includes a plurality of the elongate plates, a plurality of the ring segments arranged in end to end relationship to each other and attached to each other, a plurality of the gussets, and a plurality of the hand rails also arranged in end to end relationship to each other and attached to each other and to the gussets.

In still another principal aspect of the present invention, the assembly includes a plurality of hand rails comprising substantially vertical posts attached at one end to the gussets, and a plurality of horizontal rails attached to the posts toward other end of the posts.

In still another principal aspect of the present invention, the gusset nearest the bottom of the roof is fastened to the ring segment nearest the bottom of the roof and the end of the gusset nearest the top of the roof is fastened to the ring segment nearest the top of the roof and to the vertical post.

In still another principal aspect of the present invention, the end of the gusset nearest the top of the roof is fastened to the vertical post, and the bottom of the vertical post is attached to the ring segment nearest the top of the roof.

In still another principal aspect of the present invention, the ring segments flex to permit the ring segments to conform to the curvature of the roof.

In still another principal aspect of the present invention, at least one of the ring segments is substantially Z-shaped in cross section comprising an upper and lower flange extending in opposite directions from a web connecting the flanges, the lower flange including the openings in the ring segments, and the flanges including spaced slots which permit the ring segments to flex.

In still another principal aspect of the present invention, the generally cylindrical storage container is a grain bin.

These and other objects, features and advantages of the present invention will become readily understood upon a consideration of the following detailed description.

BRIEF DESCRIPTION OF THE DRAWINGS

In the course of this description, the drawings will frequently be referred to in which:

FIG. 3 is an exploded view of the single hand rail assembly unit shown in FIG. 2 and showing its individual components; and FIG. 4 is a side elevation view of the single hand rail assembly unit as viewed substantially along line 4-4 of FIG. 2.

DESCRIPTION OF THE PREFERRED EMBODIMENT

Figure 1:
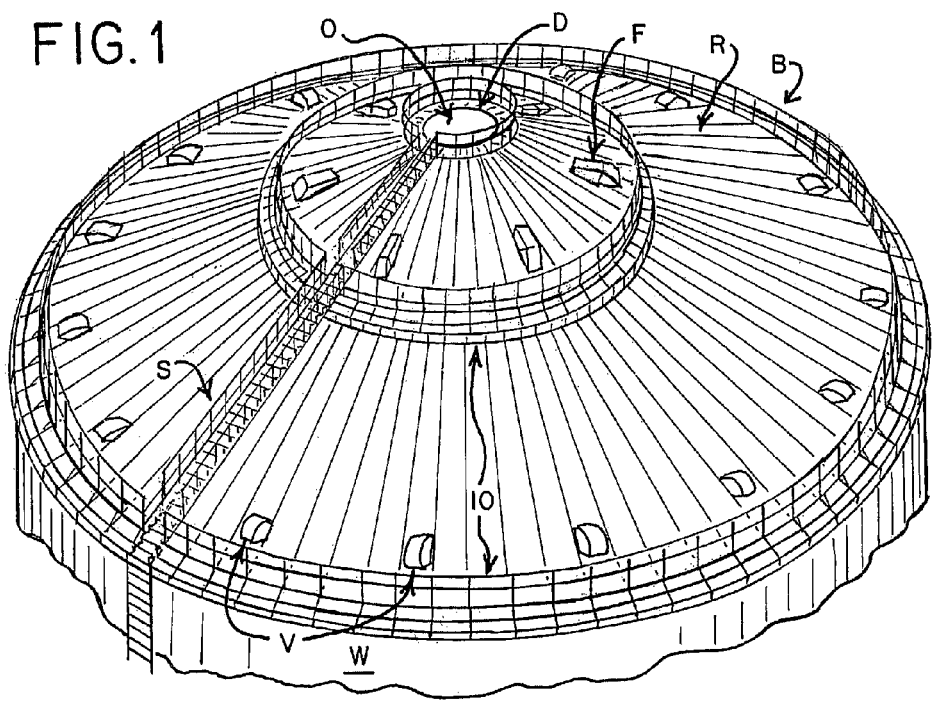
FIG. 1 is a perspective, broken view of the top of a grain bin including two hand rail assemblies on its inclined roof and which incorporate the principles of the present invention.

As shown in FIG. 1, a generally cylindrical storage structure, such as a grain bin B for the storage of grain, is shown having an inclined roof R. In such grain bins the grain is loaded by a conveyor (not shown) into the bin through an access opening O at the top apex of the roof R. Once the grain has been loaded into the bin, the opening O is closed by a closure (not shown) to prevent the entry of rain and other foreign materials into the bin.

In order to facilitate the loading of the grain bin B, a small deck D is typically located adjacent to the opening O. In the alternative, a hand rail assembly of the present invention to be described to follow may be substituted for the deck D.

Power exhaust fans F are also typically mounted to the roof R near the top of the roof but somewhat down the incline from the deck D and access opening O, and vents V are spaced from each other around the bottom of the roof as seen in FIG. 1. The power exhaust fans F are spaced from each other around the curvature of the roof R as seen in FIG. 1. By drawing in air through the vents V the interior of the grain bin is ventilated to remove undesirable moisture and possibly hazardous dust from the grain bin B. It is important that the power exhaust fans are operative to perform their function so it is desirable to be able to service these fans on an ongoing basis to ensure their continuing operation. However, access to these fans for that purpose from the interior of the filled grain bin is limited. Accordingly, in the past a deck has been constructed on the inclined roof adjacent the power exhaust fans F and on the exterior of the roof R to permit access for the servicing of the power exhaust fans. Both the exhaust fan deck and the deck D at the top of the grain bin have also in the past been accessed by steps S as shown in FIG. 1.

As previously discussed, the deck in the past has been constructed by the assembly of a variety of components which have been custom sized and shaped to conform to a given manufacturer's grain bin. This is because each of the respective manufacturer's grain bins are of different sizes and configurations and the roof ribs of the different manufacturers have openings used to assemble the roof which differ in spacing from each other depending on the manufacturer of the grain bin. Because these roof rib openings are also utilized to attach the deck to the roof, this difference in opening spacing required further customization of the deck components. Moreover, the power exhaust fans F may be placed at different locations down the incline of the roof from the opening O depending upon the manufacturer. Thus, at the location at which the deck is to be assembled, the spacing of the roof ribs may be different depending upon the positioning of the power exhaust fans F of different manufacturers. This has necessitated customization of the various deck components to accommodate the respective configurations of the individual different grain bin manufacturers.

Also as previously discussed, the need for such customization of the size and shape of the components needed to construct the deck is obviated by the deck disclosed in my aforementioned U.S. application Ser. No. 13/606,296 filed Sep. 7, 2012. In the deck disclosed in that application substantially all of the components of the deck may be of standard, uniform size and shape without regard to the features of the grain bin, the spacing of the roof assembly components or the roof ribs, or the manufacturer of the grain bin. This substantially facilitated the assembly of that deck and substantially reduced the inventory of components needed to accommodate the several different manufacturer's grain bins that are currently on the market.

The vents V also need to be accessed when preparing to fumigate the ingredients in the grain bin to cover the vents to prevent air flow through them into the bin during the fumigation process, and to uncover the vents after fumigation is completed to permit the power exhaust fans F to resume drawing air through the vents V to remove undesirable moisture and possibly hazardous dust from the grain bin B. The vents also need to be accessed to prevent dangerous air pressure conditions caused by the vent screen becoming clogged with debris from the grain or icing which can be hazardous. A side wall deck which is mounted to the side wall W of the grain bin B to facilitate access to these vents V for those purposes is disclosed in my aforementioned U.S. application Ser. No. 13/630,576, filed Sep. 28, 2012. That side wall deck also obviates the need for the customization of the size and shape of the components needed to construct the deck.

In some installations it may be desirable to replace one or both of the aforementioned decks or to substitute for them a simpler hand rail assembly of the present invention to reduce the weight, the expense and/or the time and effort needed to assemble the assembly. In the present invention the decks have been eliminated and the service personnel walk directly on the inclined roof R of the grain bin.

Figure 2:
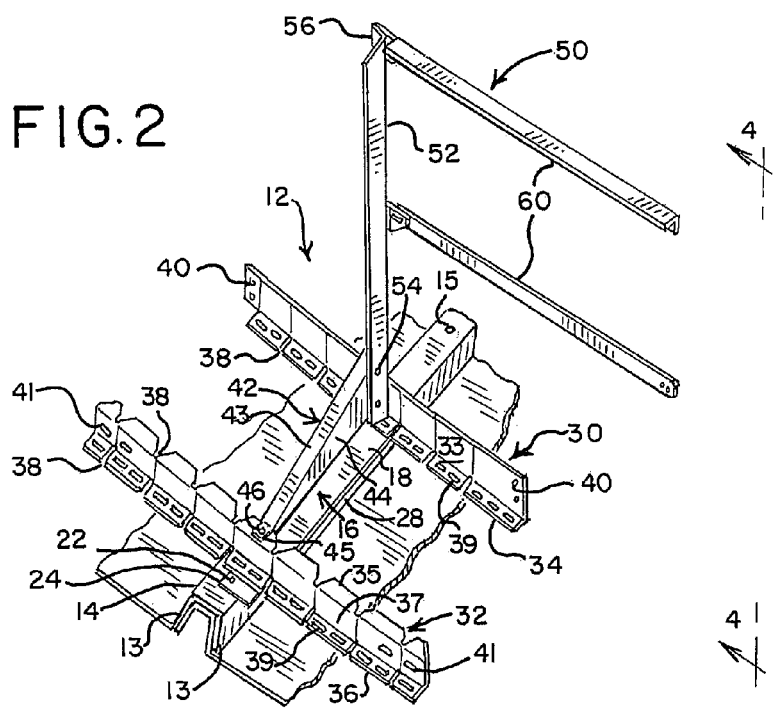
FIG. 2 is an enlarged, broken view of a single hand rail assembly unit assembled and mounted to the roof of the grain bin shown in FIG. 1.

The hand rail assembly 10 of the present invention as shown in FIG. 1 comprises a plurality of end to end hand rail assembly units 12 as are shown in FIGS. 2-4. The hand rail assembly units 12 comprise a plurality of components which are constructed and designed to be assembled together to form each hand rail assembly unit and those units are mounted to the roof ribs 14 of the roof R as seen in FIGS. 2-4. In the conventional grain bin roof R and its ribs 14, each of the roof panels typically include a raised channel 13 along each edge. The channel 13 along the longitudinal edge of one roof panel is placed in overlying relation to the channel 13 of the next adjacent roof panel to define the roof rib 14 which extends up the incline of the roof as seen in FIGS. 2-4. The channels 13 include openings 15 as seen in FIG. 2 which are spaced intermittently along the longitudinal length of the channels to receive fastening means for fastening the channels together to form the roof R.

In the hand rail assembly 10 of the present invention, each of the hand rail assembly units 12 comprises an elongate plate 16 which extends parallel to the incline of the roof. The plate 16 has an upper face 18 and a lower face 20 the latter of which faces the roof rib 14. The elongate plate 16 also includes at least a pair of openings 22 spaced along one of the longitudinal edges 24 of the plate as seen in FIG. 3. The distance between the openings 22 coincides with the distance between the openings 15 through the channels 13 of the roof ribs 14 so that the plate 16 may be fastened to the roof ribs 14 by the same fastening means by which the roof rib channels 13 are fastened together. Additional openings 22' as seen in dot and dash in FIG. 3 may also be included either with the openings 22 in the plate 16 or may be subsequently added to the plate to accommodate different distances between the openings in the roof channels 13 of other manufacturers, thus adapting the plate 16 to the opening spacings of several different manufacturers. The elongate plate 16 also includes an additional pair of spaced openings 26 longitudinally spaced from each other and adjacent the other longitudinal edge 28 of the elongate plate 16 as best seen in FIG. 3. The purpose of openings 26 will be further described to follow.

Each hand rail assembly unit 12 further includes a pair of ring segments 30 and 32, as seen in FIGS. 2-4, which are spaced from each other in the direction of the incline of the roof and which extend substantially perpendicular to the elongate plates 16 and are constructed and arranged to rest upon the upper face 18 of the plates 16 as shown in FIGS. 2-4. The upper ring segment 30 is L-shaped in cross section comprising an upstanding web 33 and a lower flange 34. The lower ring segment 32 is substantially Z-shaped in cross section and comprises an upper flange 35 and a lower flange 36 extending in opposite directions from a web 37 which connects the flanges 35 and 36. The upper and lower flanges 35 and 36 of ring segment 32 and the flange 34 of ring segment 30 also are periodically slotted at 38 to permit the ring segments 30 and 32 to flex and bend to conform with the curvature of the roof R. The lower flange 34 of ring segment 30 and the lower flange 36 of the ring segment also include a plurality of longitudinally extending spaced slots 39 along their length as best seen in FIGS. 2-3. This permits the ring segments 30 and 32 to be fastened by suitable fastening means such as a bolt or rivet, through the openings 26 in the elongate plate 16 anywhere along the length of the ring segments 30 and 32. This permits the ring segments to be of standard length and yet be able to accommodate attachment to the elongate plates 16 at any location along their length without regard to the spacing between the roof ribs 14 from each other.

The ring segment 30 also includes openings 40 at each end, and the ring segment 32 includes slots 41 at each end as best seen in FIGS. 2-3 to permit next adjacent ring segments to be attached together at their ends to form a continuous ring around the roof R. Again, this permits accommodation of somewhat varying roof configurations between manufacturers and the standardization of the ring segment components of the hand rail assembly unit 12.

Each of the hand rail assembly units 12 also includes a gusset 42 which is generally triangular in outline. The gusset 42 is preferably generally L-shaped in cross section and has an upper flange 43 and a triangular web 44 as best seen in FIGS. 2-4. The upper flange 43 of the gusset 42 at its lower end has a projection 45 with an opening 46 which aligns with an opening 47 in the upper flange 35 of the lower ring segment and intermediate its length to receive fastening means for fastening the gusset 42 to the lower ring segment 32. The gusset 42 also has openings 48 in its web 44 and along its vertical upper edge as seen in FIG. 3 for purposes which will be described to follow.

Finally, the various components of the hand rails 50 are attached to the hand rail assembly units 12. The hand rails 50 comprise a vertical post 52 having openings 54 at the bottom which are aligned with the openings 48 in the gusset 42 to attach the post 52 to the gusset web 14 along the vertical edge of the gusset 42. The vertical post 52 is L-shaped and has a vertical flange 56 which has openings (not seen) at the bottom which align with openings 58, as best seen in FIG. 3, on the web 33 of the upper ring segment 30 to fasten the vertical post 52 to the web 33 of the upper ring segment 30. The post 52 also includes additional openings (not seen) toward the other end of the post to permit attaching one or more horizontal rails 60 further up the post 52 by way of suitable couplers 62.

As previously mentioned as in the decks disclosed in both of my aforementioned applications, the hand rail assembly of the present invention overcomes the need for customization of the sizes and shapes of the components needed to assemble a hand rail assembly on a given grain bin. All of the components of the hand rail assembly of the present invention may be of standard uniform size and shape without regard to the size of the grain bin or is configuration, the spacing of the roof ribs on the grain bin or fastener openings in the ribs, or the manufacturer of the grain bin. This substantially facilitates the assembly and installation of the hand rail assembly and substantially reduces the inventory of components needed to accommodate the several different grain bins that are currently on the market.

It will be appreciated that although a hand rail assembly 10 of the present invention is shown in FIG. 1 at both the fans F and the vents V and a deck D is shown at the opening O, other combinations of deck and/or hand rail assemblies are possible.

It also will be appreciated that the preferred embodiment of the invention which has been described as merely illustrative of only a few of the principles of the present invention.

Numerous modifications may be made by those skilled in the art without departing from the true spirit and scope of the present invention.

The invention claimed is:

1. A hand rail assembly for an inclined roof of a generally cylindrical storage structure, the assembly comprising:
an elongate plate extending substantially parallel to the incline of the roof and having an upper face and a lower face facing the roof, said plate having a first pair of openings longitudinally spaced from each other and adjacent one longitudinal edge of said plate, and a second pair of openings longitudinally spaced from each other and adjacent the other longitudinal edge of said plate, the spacing of said first pair of openings being substantially the same as the spacing of openings in the roof whereby the plate may be attached to the roof with the lower face facing the roof by fastening means extending through said first openings and the openings in the roof;
a pair of ring segments spaced from each other in the direction of the incline of the roof and extending substantially perpendicular to said elongate plate and constructed and arranged to rest upon said upper face of said plate, a plurality of openings in each of said ring segments at least one of which is aligned with said second pair of openings in said plate whereby said ring segments may be attached to said upper face of said elongate plate by fastening means extending through at least one of said openings in each of said ring segments and said second openings in said plate;
a gusset extending substantially parallel to the incline of the roof and upwardly from the side of said ring segments opposite said plate, said gusset and said ring segments having fastening means for attaching them together; and
a hand rail comprising a substantially vertical post attached at one end to said gusset, and at least one horizontal rail attached to said post toward its other end.

2. The hand rail assembly of claim 1, wherein said ring segments have a plurality of said openings spaced from each other along the length of said ring segments.

3. The hand rail assembly of claim 2, wherein said openings in said ring segments are slots.

4. The hand rail assembly of claim 3, wherein said gusset is substantially triangular in outline.

5. The hand rail assembly of claim 1, wherein said gusset is substantially triangular in outline.

6. The hand rail assembly of claim 1, including a plurality of said elongate plates, a plurality of said ring segments arranged in end to end relationship to each other and attached to each other, a plurality of said gussets, and a plurality of said hand rails also arranged in end to end relationship to each other and attached to each other and to said gussets.

7. The hand rail assembly of claim 1, wherein the end of said gusset nearest the bottom of said roof is fastened to the ring segment nearest the bottom of the roof, and the end of said gusset nearest the top of said roof is fastened to the ring segment nearest the top of said roof and to said vertical post.

8. The hand rail assembly of claim 7, wherein the end of said gusset nearest the top of said roof is fastened to said vertical post, and the bottom of said vertical post is attached to the ring segment nearest the top of said roof.

9. The hand rail assembly of claim 1, wherein said ring segments flex to permit said ring segments to conform to the curvature of the roof.

10. The hand rail assembly of claim 9, wherein at least one of said ring segments is substantially Z-shaped in cross section comprising an upper and lower flange extending in opposite directions from a web connecting the flanges, said lower flange including said openings in said ring segments, and said flanges including spaced slots which permit said ring segments to flex.

11. The hand rail assembly of claim 1, wherein the generally cylindrical storage structure is a grain bin.

12. The hand rail assembly of claim 6, wherein the generally cylindrical storage structure is a grain bin.

13. A hand rail assembly for an inclined roof of a generally cylindrical storage structure, the assembly comprising:
plate extending having an upper face and a lower face and openings spaced from each other and adjacent each longitudinal edge of said plate, the spacing of said openings being substantially the same as the spacing of openings in the roof whereby the plate may be attached to the roof;
a pair of ring segments extending substantially perpendicular to said elongate plate which rest upon said plate, openings in each of said ring segments at least one of which is aligned with openings in said plate whereby said ring segments may be attached to said upper face of said plate;
a gusset extending upwardly from said ring segments opposite said plate, said gusset and said ring segments are attached together; and
a hand rail comprising a substantially vertical post attached at one end to said gusset, and at least one horizontal rail attached to said post toward its other end.

14. The hand rail assembly of claim 13, wherein said ring segments have a plurality of said openings spaced from each other along the length of said ring segments.

15. The hand rail assembly of claim 14, wherein said openings in said ring segments are slots.

16. The hand rail assembly of claim 15, wherein said gusset is substantially triangular in outline.

17. The hand rail assembly of claim 13, wherein said gusset is substantially triangular in outline.

18. The hand rail assembly of claim 13, including a plurality of said elongate plates, a plurality of said ring segments arranged in end to end relationship to each other and attached to each other, a plurality of said gussets, and a plurality of said hand rails also arranged in end to end relationship to each other and attached to each other and to said gussets.

19. The hand rail assembly of claim 13, wherein the end of said gusset nearest the bottom of said roof is fastened to the ring segment nearest the bottom of the roof, and the end of said gusset nearest the top of said roof is fastened to the ring segment nearest the top of said roof and to said vertical post.

20. The hand rail assembly of claim 19, wherein the end of said gusset nearest the top of said roof is fastened to said vertical post, and the bottom of said vertical post is attached to the ring segment nearest the top of said roof.

21. The hand rail assembly of claim 13, wherein said ring segments flex to permit said ring segments to conform to the curvature of the roof.

22. The hand rail assembly of claim 21, wherein at least one of said ring segments is substantially Z-shaped in cross section comprising an upper and lower flange extending in opposite directions from a web connecting the flanges, said lower flange including said openings in said ring segments, and said flanges including spaced slots which permit said ring segments to flex.

23. The hand rail assembly of claim 13, wherein the generally cylindrical storage structure is a grain bin.

24. The hand rail assembly of claim 18, wherein the generally cylindrical storage structure is a grain bin.

* * * * *